(12) United States Patent
Chen et al.

(10) Patent No.: US 11,449,541 B2
(45) Date of Patent: Sep. 20, 2022

(54) FACE RETRIEVAL METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Zhibo Chen, Shenzhen (CN); Nan Jiang, Shenzhen (CN); Chuannan Wang, Shenzhen (CN); Kaihong Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 236 days.

(21) Appl. No.: 16/988,178

(22) Filed: Aug. 7, 2020

(65) Prior Publication Data
US 2021/0026882 A1    Jan. 28, 2021

Related U.S. Application Data

(63) Continuation of application No. PCT/CN2019/079638, filed on Mar. 26, 2019.

(30) Foreign Application Priority Data

May 4, 2018 (CN) .......................... 201810425714.5

(51) Int. Cl.
*G06F 16/00* (2019.01)
*G06F 16/532* (2019.01)
(Continued)

(52) U.S. Cl.
CPC .......... *G06F 16/532* (2019.01); *G06F 16/436* (2019.01); *G06F 16/55* (2019.01); *G06V 40/171* (2022.01); *G06V 40/172* (2022.01)

(58) Field of Classification Search
CPC .................................................... G06F 16/436
See application file for complete search history.

(56) References Cited

U.S. PATENT DOCUMENTS

2019/0325198 A1\* 10/2019 Friedland ............. G08B 13/196

FOREIGN PATENT DOCUMENTS

CN      105574506 A      5/2016
CN      107403173 A      11/2017
(Continued)

OTHER PUBLICATIONS

International Search Report dated May 31, 2019 in PCT Application No. PCT/CN2019/079638, 9 pgs.

*Primary Examiner* — Ajith Jacob
(74) *Attorney, Agent, or Firm* — ArentFox Schiff LLP

(57) ABSTRACT

A face retrieval method is applied to a face retrieval system and performed by a computing device, the face retrieval system including a retrieval device cluster, the retrieval device cluster including at least one node. The method includes acquiring a face image, parsing the face image to obtain a first facial feature, and generating a first retrieval instruction according to the first facial feature, the first retrieval instruction carrying the first facial feature. The method further includes selecting a first node from the retrieval device cluster according to a load balancing rule, the first node including a first retrieval server. Finally, the method includes transmitting the first retrieval instruction to the first retrieval server, to trigger the first retrieval server to execute the first retrieval instruction to retrieve the first facial feature, to obtain a first retrieval result.

19 Claims, 7 Drawing Sheets

(51) Int. Cl.
*G06F 16/55* (2019.01)
*G06V 40/16* (2022.01)
*G06F 16/435* (2019.01)

(56) References Cited

FOREIGN PATENT DOCUMENTS

| | | |
|---|---|---|
| CN | 108664914 A | 10/2018 |
| JP | 2013140475 A | 7/2013 |

* cited by examiner

FACE RETRIEVAL METHOD AND APPARATUS, SERVER, AND STORAGE MEDIUM

RELATED APPLICATION

This application is a continuation of International Application No. PCT/CN2019/079638, filed on Mar. 26, 2019, which claims priority to Chinese Patent Application No. 201810425714.5, filed on May 4, 2018, and entitled "FACE RETRIEVAL METHOD AND APPARATUS, AND SERVER." The entire disclosures of the prior applications are hereby incorporated by reference in their entirety.

FIELD OF THE TECHNOLOGY

The disclosure relates to the field of image processing technologies.

BACKGROUND OF THE DISCLOSURE

Face retrieval has important applications in fields such as personnel management and video monitoring, for example, identity authentication of a person and query of an activity track of a suspect. Currently, face retrieval is only locally applied. Therefore, when there is enough internal memory and the amount of facial data involved is limited, using a single-server architecture to perform face retrieval is the main technical solution currently.

SUMMARY

Embodiments of the disclosure provide a face retrieval method, which is implemented using an apparatus, a scheduling server, a retrieval server, and/or a storage medium, which can resolve problems of limited processing speeds and poor failure tolerance of a face retrieval system, thereby improving the speed of face retrieval.

In an embodiment, a face retrieval method is applied to a face retrieval system, the face retrieval system including a retrieval device cluster, the retrieval device cluster including at least one node. The method is performed by a computing device and includes acquiring a face image, parsing the face image to obtain a first facial feature, and generating, by processing circuitry of the computing device, a first retrieval instruction according to the first facial feature, the first retrieval instruction carrying the first facial feature. The method also includes selecting, by the processing circuitry of the computing device, a first node from the retrieval device cluster according to a load balancing rule, the first node including a first retrieval server. Finally, the method includes transmitting the first retrieval instruction to the first retrieval server, to trigger the first retrieval server to execute the first retrieval instruction, to obtain a first retrieval result.

In an embodiment, the retrieval device cluster further includes a first root server, and the first node belongs to the first root server, and the transmitting includes transmitting the first retrieval instruction to the first root server. The transmitting also includes controlling the first root server to distribute the first retrieval instruction to the first retrieval server, to trigger the first retrieval server to execute the first retrieval instruction, to obtain the first retrieval result.

In an embodiment, the first node further includes a second retrieval server, and after the transmitting the first retrieval instruction to the first root server, the method further includes controlling the first root server to distribute the first retrieval instruction to the second retrieval server, to trigger the second retrieval server to execute the first retrieval instruction, to obtain a second retrieval result.

In an embodiment, the selecting includes obtaining a load value of each node in the retrieval device cluster, and selecting, from the retrieval device cluster, as the first node, a node having a load value that is less than a threshold.

In an embodiment, the method further includes obtaining a second retrieval instruction, the second retrieval instruction carrying a second facial feature, and selecting a second node from the retrieval device cluster according to the load balancing rule, the second node including a third retrieval server. The method further includes allocating the second retrieval instruction to the third retrieval server, to trigger the third retrieval server to execute the second retrieval instruction, to obtain a third retrieval result. Finally, the method includes returning at least one of the first retrieval result, the second retrieval result, and the third retrieval result to a terminal for output.

In an embodiment, a face retrieval method is applied to a face retrieval system, the face retrieval system including a retrieval device cluster, the retrieval device cluster including at least a first node, the first node including a first retrieval server. The method is performed by the first retrieval server and includes receiving a first retrieval instruction transmitted by a scheduling server, the first retrieval instruction carrying a first facial feature, the first retrieval instruction being generated by the scheduling server according to the first facial feature after acquiring a face image and parsing the face image to obtain the first facial feature, and the first retrieval instruction being transmitted after the scheduling server selects the first node from the retrieval device cluster according to a load balancing rule. The method also includes executing, by processing circuitry of the first retrieval server, the first retrieval instruction to obtain a first retrieval result, and returning the first retrieval result to the scheduling server.

In an embodiment, the executing includes matching the first facial feature with each reference feature in a database, the database including at least one reference feature and user data corresponding to each reference feature. The executing also includes obtaining, from the database, first user data corresponding to a reference feature in the database matching the first facial feature in a case where the matching is successful. Finally, the executing includes generating the first retrieval result, the first retrieval result including the first user data.

In an embodiment, the database further comprises a label attribute of each reference feature, and the matching includes determining a target label attribute of the first facial feature, and extracting, from the database, a reference feature set corresponding to the target label attribute. The matching also includes matching the first facial feature with each reference feature in the extracted reference feature set.

In an embodiment, the database further comprises at least one compressed feature obtained after dimension reduction and/or precision compression is performed on each reference feature, and the matching includes performing dimension reduction and/or precision compression on the first facial feature to generate a processed first facial feature. The matching also includes matching the processed first facial feature with each compressed feature in the database.

In an embodiment, before the executing the first retrieval instruction, the method further includes allocating continuous storage space in an internal memory according to dimensions of the first facial feature. Finally, the method includes, loading the first facial feature into the allocated continuous storage space for continuous storage.

In an embodiment, after the receiving the first retrieval instruction transmitted by the scheduling server, the method further includes combining, in a case where a second retrieval instruction transmitted by the scheduling server is received, the first retrieval instruction and the second retrieval instruction into a batch, and performing face retrieval in batches.

In an embodiment, a face retrieval apparatus is applied to a face retrieval system, the face retrieval system including a retrieval device cluster, the retrieval device cluster including at least one node. The apparatus including processing circuitry configured to acquire a face image, parse the face image to obtain a first facial feature, and generate a first retrieval instruction including the first facial feature. The processing circuitry is further configured to select a first node from the retrieval device cluster according to a load balancing rule, the first node including a first retrieval server. Finally, the processing circuitry is configured to transmit the first retrieval instruction to the first retrieval server, to trigger the first retrieval server to execute the first retrieval instruction, to obtain a first retrieval result.

In an embodiment, a scheduling server includes a processor, configured to implement one or more instructions, and a non-transitory computer storage medium, storing one or more instructions, the one or more instructions causing the processor to perform the face retrieval method according to the above-described embodiments.

In an embodiment, a retrieval server includes a processor, configured to implement one or more instructions, and a non-transitory computer storage medium, storing one or more instructions, the one or more instructions causing the processor to perform the face retrieval method according to the above-described embodiments.

In an embodiment, a non-transitory computer-readable storage medium stores a machine-readable instruction, the machine-readable instruction being executable by a processor to perform the face retrieval method according the above-described embodiments.

In an embodiment, a non-transitory computer-readable storage medium stores a machine-readable instruction, the machine-readable instruction being executable by a processor to perform the face retrieval method according to the above-described embodiments.

In an embodiment, the obtaining the load value of each node in the retrieval device cluster includes establishing a dynamic load table indicating the load value of each node in the retrieval device cluster. The obtaining also includes updating the dynamic load table to reflect current load distribution by repeatedly determining, for each node a load value of each of one or more retrieval servers in the respective node, and the load value of the respective node by averaging the load values of the one or more retrieval servers in the respective node. Finally, the obtaining includes obtaining the load value of each node in the retrieval device cluster from the dynamic load table.

In an embodiment, the scheduling server selects the first node from the retrieval device cluster by obtaining a load value of each node in the retrieval device cluster, and the obtaining includes establishing a dynamic load table indicating the load value of each node in the retrieval device cluster. The obtaining also includes updating the dynamic load table to reflect current load distribution by repeatedly determining, for each node a load value of each of one or more retrieval servers in the respective node, and the load value of the respective node by averaging the load values of the one or more retrieval servers in the respective node. Finally, the obtaining includes obtaining the load value of each node in the retrieval device cluster from the dynamic load table.

In an embodiment, the processing circuitry selects the first node from the retrieval device cluster by obtaining a load value of each node in the retrieval device cluster, and the obtaining includes establishing a dynamic load table indicating the load value of each node in the retrieval device cluster. The obtaining also includes updating the dynamic load table to reflect current load distribution by repeatedly determining, for each node a load value of each of one or more retrieval servers in the respective node, and the load value of the respective node by averaging the load values of the one or more retrieval servers in the respective node. Finally, the obtaining includes obtaining the load value of each node in the retrieval device cluster from the dynamic load table.

BRIEF DESCRIPTION OF THE DRAWINGS

To describe the technical solutions in the embodiments of the disclosure more clearly, the following briefly describes the accompanying drawings used for describing the embodiments. The accompanying drawings in the following description show only some embodiments of the disclosure.

DESCRIPTION OF EMBODIMENTS

Figure 1:
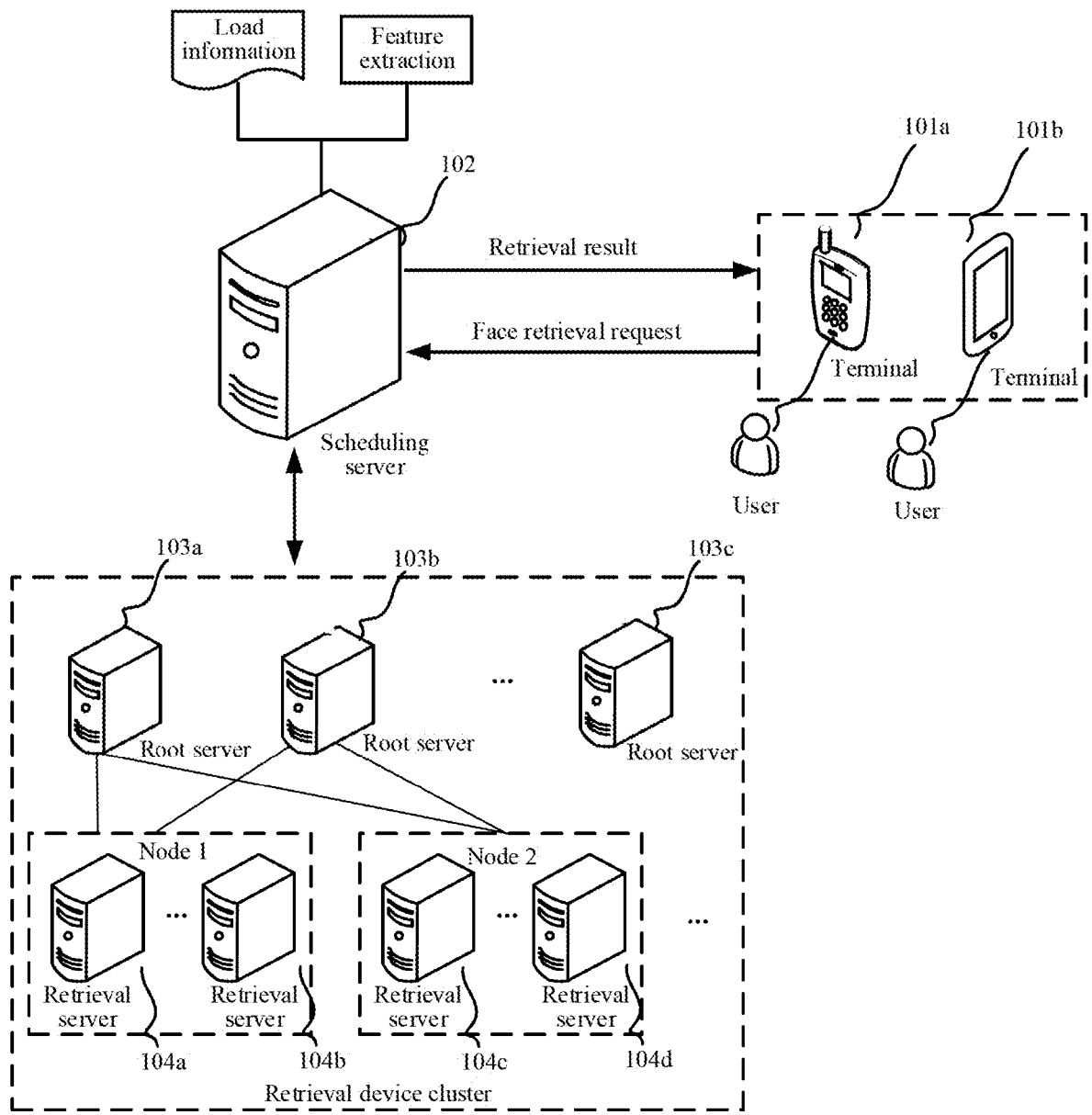
FIG. 1 is a structural diagram of a face retrieval system according to an embodiment of the disclosure.

The following describes the technical solutions in the embodiments of the disclosure with reference to the accompanying drawings in the embodiments of the disclosure. As an important visual object in an image or a video, the human face is an important object of study in many technical fields such as pattern recognition, identity authentication, computer vision, and multimedia technologies. Face retrieval is an important application based on facial information and plays an important role in many fields such as intelligent man-machine interfaces, digital image processing, and security. For example, some unlocking is determined by verifying that a target face matches a face in a database. For another example, identity information corresponding to a face image can be found from a database by inputting the face image. For still another example, the location of a target person can be searched for by obtaining a face image from a surveillance video. The foregoing descriptions may be considered as specific applications of face retrieval technologies.

In the related art of the embodiments of the disclosure, current face retrieval solutions usually use a single-server architecture, that is, only one server is used to perform face retrieval. Such an architecture is only applicable to some single retrieval scenarios such as face unlocking and face door-opening. The single retrieval scenarios involve few retrieval tasks. Generally, acquired facial data only needs to be compared with limited pre-stored facial data to complete the retrieval task. However, with development of interconnection technologies, increasing quantities of complex retrieval scenarios appear. For example, a scenario of performing face retrieval on surveillance videos from many public places, which involves massive face retrieval tasks, is a complex retrieval scenario. In complex retrieval scenarios, if the single-server architecture is still used, system fault tolerance and retrieval speed may fail to meet retrieval requirements. Moreover, if a fault occurs in a single-server architecture when processing a face retrieval, then the entire face retrieval system crashes. Therefore, using the current single-server architecture to perform face retrieval has the following problems: (1) Disaster tolerance of the single-server architecture is poor, and when a fault occurs in the server, the entire face retrieval system stagnates. (2) When the number of images to be processed exceeds the upper limit of the server, the processing speed of the server cannot satisfy requirements of the users, which causes poor user experience. If the processing capability of the server is improved to resolve the problem that the processing speed cannot satisfy the requirements of the users, costs are excessively high. In addition, such a high processing capability is not required most times. As a result, performance of the server is underutilized. Therefore, extensibility is poor when the single-server architecture is used.

Based on this, embodiments of the disclosure provide a face retrieval solution in which a cluster system architecture is used, that is, face retrieval is performed by using a retrieval device cluster formed by a plurality of servers. In addition, servers for performing face retrieval in the retrieval device cluster are selected using a load balancing rule. Compared with the current single-server architecture, the face retrieval solution based on the retrieval device cluster architecture provided in the embodiments of the disclosure has at least the following advantages: (1) Disaster tolerance is stronger, because even if some servers in the retrieval device cluster fail, operation of the entire face retrieval system is not affected. (2) A plurality of servers cooperate to process a face retrieval instruction, so that the speed of face retrieval can be improved. (3) Extensibility is better than that of the single-server architecture. (4) A retrieval server may be added to the retrieval device cluster when processing performance of the face retrieval system needs to be improved. Based on the foregoing advantages, the face retrieval solution in the embodiments of the disclosure can be well applied to a retrieval scenario with high complexity and high throughput. In particular, a retrieval scenario containing many faces, face retrieval efficiency and disaster tolerance can be effectively improved by using the face retrieval system in the embodiments of the disclosure.

Based on the foregoing descriptions, an embodiment of the disclosure provides a face retrieval system. Referring to FIG. 1, the face retrieval system includes: a scheduling server 102, at least one terminal 101 (FIG. 1 shows a plurality of terminals 101, for example, terminals 101a and 101b in FIG. 1) connected to the scheduling server 102, and a retrieval device cluster connected to the scheduling server 102. The terminal 101 may include, but is not limited to, a mobile phone, a tablet, a computer, and the like. The terminal 101 is configured to interact with a user, for example by receiving a face image uploaded by the user, and configured to interact with the scheduling server, for example by sending an uploaded face image to the scheduling server to initiate a request to obtain a face retrieval service. The scheduling server 102 is configured to receive a face image sent by the terminal 101, extract a facial feature from the image, and send the extracted facial feature to the retrieval device cluster. The retrieval device cluster is a cluster specifically performing a face retrieval task. The retrieval device cluster is formed by one or more nodes. Each node includes at least one retrieval server 104 (FIG. 1 shows a plurality of retrieval servers 104, for example, retrieval servers 104a, 104b, 104c, and 104d in FIG. 1). Specifically, the retrieval device cluster performs the face retrieval task by using the retrieval server at each node. In an embodiment of the disclosure, the retrieval device cluster includes at least one node. The at least one node may be directly connected to the scheduling server. In another embodiment of the disclosure, the retrieval device cluster may include at least one root server 103 (FIG. 1 shows a plurality of root servers 103, for example, root servers 103a, 103b, and 103c in FIG. 1) and at least one node. The root server 103 is connected to the scheduling server 102, and is connected to the plurality of nodes at the same time. That is, the nodes are connected to the scheduling server 102 through the root server 103.

An operating principle of the system shown in FIG. 1 includes: (1) The terminal sends a retrieval request to the scheduling server. In a specific implementation, the terminal may provide an interactive interface for face retrieval. For example, the terminal displays a World Wide Web (web) page for the face retrieval system. The terminal may obtain a single face image through the web page and initiate a retrieval request for the single face image to the scheduling server. In a different implementation, the terminal may upload a video to the terminal, including many face images, through the web page and initiate a retrieval request for many face images to the scheduling server. (2) The scheduling server performs feature extraction on the face image carried in the retrieval request sent by the terminal, to obtain a facial feature. The feature extraction process in this embodiment of the disclosure supports offline extraction or online extraction. The online feature extraction process is that: the terminal uploads a face image, and the scheduling server performs feature extraction on the face image in real time. The offline feature extraction process is that: after the terminal uploads a face image, the scheduling server stores the face image, and performs feature extraction on the face image in a subsequent period of time according to an offline policy. The offline policy herein may include: performing offline feature extraction when a quantity of stored face images reaches a threshold; or performing feature extraction on the stored face images only when a face retrieval task is actually performed; or the like. (3) The scheduling server generates a retrieval instruction according to the extracted facial feature. One retrieval instruction includes one facial feature. Therefore, one retrieval instruction is generated for a retrieval request for a single face, and a plurality of retrieval instructions are generated for a retrieval request for a plurality of faces. (4) The scheduling server sends the retrieval instruction to the retrieval device cluster. In an embodiment, to ensure quick response and smooth progress of a retrieval process, the scheduling server may allocate the retrieval instruction to a node in the retrieval device cluster based on a load balancing rule. A specific process may include: (1) For a single retrieval instruction, the scheduling server may obtain a target node in the retrieval device cluster based on the load balancing rule, for example, a node with the smallest load value may be selected as a target node; then the scheduling server sends the retrieval instruction to a retrieval server at the target node, and the retrieval server performs face retrieval according to the retrieval instruction. (2) For a plurality of retrieval instructions, the scheduling server may obtain one or more target nodes in the retrieval device cluster based on the load balancing rule, and then evenly allocate the plurality of retrieval instructions to the one or more target nodes; and retrieval servers at the one or more target nodes cooperate to execute the plurality of retrieval instructions. Retrieval servers in the same node execute the same retrieval instruction. In this way, if some retrieval servers in the system fail, normal operation of the face retrieval system can be ensured. In addition, when the retrieval capability of the face retrieval system cannot satisfy user requirements, a retrieval server may be added to a node of the face retrieval system, so that the retrieval capability of the entire face retrieval system may be improved.

In some embodiments, the face retrieval system shown in FIG. 1 is applicable to both a retrieval scenario of a single face and a retrieval scenario of a plurality of faces. In addition, the face retrieval system has at least the following advantages: (1) Disaster tolerance is good because even if some servers in the retrieval device cluster fail in a face retrieval process, operation of the overall face retrieval system is not affected. (2) Face retrieval is performed by using a cluster architecture such as the retrieval device cluster, that is, a plurality of servers cooperate to process a face retrieval instruction, which can improve a speed of face retrieval. (3) Extensibility is good because when processing performance of face retrieval needs to be improved, a retrieval server may be added to a node of the retrieval device cluster.

Figure 2:
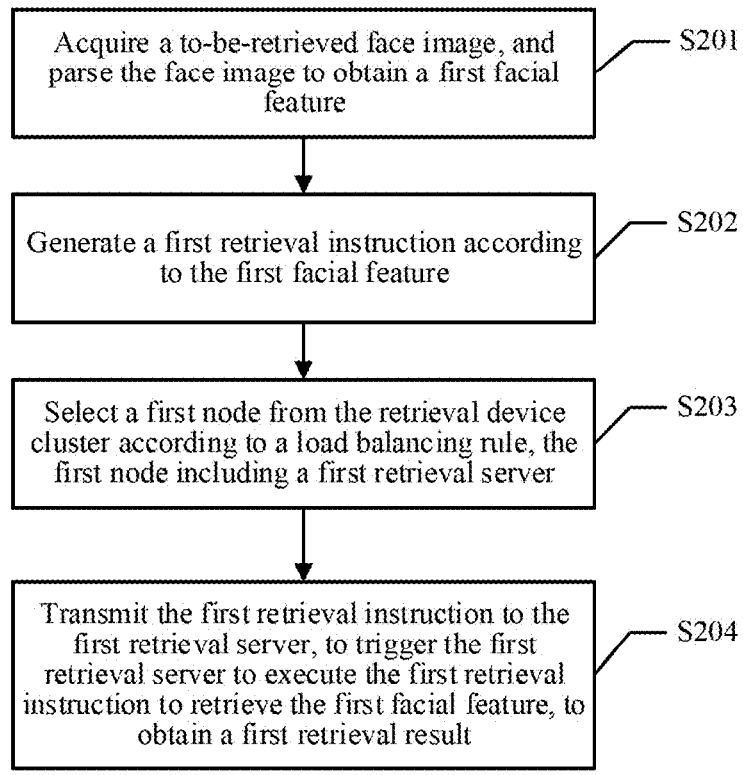
FIG. 2 is a flowchart of a face retrieval method according to an embodiment of the disclosure.

Based on the descriptions of the embodiment of the foregoing face retrieval system, an embodiment of the disclosure provides a face retrieval method. The method may be applied to the face retrieval system shown in FIG. 1, and may be specifically performed by the scheduling server 102 shown in FIG. 1. Referring to FIG. 2, the face retrieval process may include the following steps S201 to S204:

In step S201, a to-be-retrieved face image is acquired, and the face image is parsed to obtain a first facial feature.

In an embodiment, the scheduling server receives an image that is sent online by the terminal and that includes a face. The image may be uploaded by a user in a specified page of the terminal and obtained by the terminal. The specified page may be an interactive interface for face retrieval provided by the terminal, for example, a website page for uploading a to-be-retrieved image. The user may select an image from an image library of the terminal to upload to the page. After detecting the uploading operation of the user, the terminal sends the image uploaded by the user to the scheduling server. The scheduling server acquires the to-be-retrieved image that is sent by the terminal and that includes a face, and parses the acquired image to obtain the first facial feature. In an embodiment, if the terminal uploads only one face image, the first facial feature is obtained by performing feature extraction on the uploaded face image. If the terminal uploads a plurality of face images, the first facial feature may be any one of a plurality of facial features obtained after the scheduling server performs feature extraction on each of the face images.

In another embodiment, the scheduling server acquires a to-be-retrieved image including a face from the image library offline. The image library stores at least one to-be-retrieved image including a face. The image in the image library may be uploaded by the user by using the terminal, or may be automatically captured from a video obtained by a monitoring device (such as a camera). Similarly, if the scheduling server obtains only one face image from the image library, the first facial feature is obtained by performing feature extraction on the face image. If the scheduling server obtains a plurality of face images, the first facial feature may be any one of a plurality of facial features obtained after the scheduling server performs feature extraction on each of the face images.

In step S202, a first retrieval instruction is generated according to the first facial feature.

After parsing the face image to obtain the first facial feature, the scheduling server may generate the first retrieval instruction according to the first facial feature. The first retrieval instruction carries the first facial feature, and the first retrieval instruction is used for instructing to perform face retrieval on the first facial feature.

In step S203, a first node is selected from the retrieval device cluster according to a load balancing rule, the first node including a first retrieval server.

The load balancing rule is a rule aiming at a relatively balanced state among load values of the nodes in the retrieval device cluster. The load value herein may be used to represent a ratio of a current load to a maximum load, and may also be referred to as a load ratio. The load balancing rule may include, but is not limited to: a ratio of a current load to a maximum load of each node is less than a preset threshold, where the preset threshold herein may be set according to system requirements, for example, the preset threshold may be 50% or 60%; or ratios of current loads to maximum loads of the nodes tend to be equal. A load value of a node is determined by a load value of each retrieval server at the node.

In step S203, the scheduling server obtains a load value of each node in the retrieval device cluster.

A load value of a node is determined by a load value of each retrieval server at the node. The scheduling server manages and maintains a dynamic load table. The dynamic load table is shown in the following Table 1:

TABLE 1

| Dynamic load table | | |
|---|---|---|
| Node | | Load value |
| Node 1 | Retrieval server 11 (load value: 50%) | 45% |
| | Retrieval server 12 (load value: 40%) | |
| Node 2 | Retrieval server 21 (load value: 80%) | 80% |
| ... | ... | ... |

As shown in Table 1, the dynamic load table records the load value of each node and the load value of each retrieval server at each node. For example, the load value of the node 1 is 45%, and the node 1 includes two retrieval servers. The load value of one retrieval server 11 is 50%, and the load value of another retrieval server 12 is 40%. For another example, the load value of the node 2 is 80%. The node 2 includes one retrieval server, and the load value of the retrieval server is 80%. It can be learned that a load value of a node is determined by a load value of each retrieval server included in the node. The data in Table 1 changes in real time. In an embodiment, the retrieval server of each node may report respective load value at a regular interval (for example, every two seconds or every five seconds). The scheduling server determines whether the load value of each retrieval server changes, and updates Table 1 in real time according to the reported data if the load value changes. In another embodiment, when finding by self-checking that the load value changes, the retrieval server of each node reports the changed load value to the scheduling server, and the scheduling server updates Table 1 in real time according to the reported data.

Using an example in which the load balancing rule is that a ratio of a current load to a maximum load of each node is less than a preset threshold, the scheduling server selects, from the retrieval device cluster, a first node whose load value is less than a preset threshold. The preset threshold herein may be set according to system requirements. For example, the preset threshold may be 50% or 60%. If there is only one node whose load value is less than the preset threshold in the retrieval device cluster, the node is determined as the first node. If there are a plurality of nodes whose load values are less than the preset threshold in the retrieval device cluster, the scheduling server may select any one of the nodes as the first node.

In step S204, the first retrieval instruction is transmitted to the first retrieval server, to trigger the first retrieval server to execute the first retrieval instruction to retrieve the first facial feature, to obtain a first retrieval result.

The first node includes the first retrieval server. After determining the first node, the scheduling server may send the first retrieval instruction to the first retrieval server, to trigger the first retrieval server to execute the first retrieval instruction to retrieve the first facial feature, to obtain the first retrieval result. In an embodiment, if a connection is directly established between the scheduling server and the first node, in step S204, the scheduling server directly sends the first retrieval instruction to the first retrieval server of the first node. In another embodiment, if the scheduling server is connected to the first node through a first root server, in step S204, the scheduling server sends the first retrieval instruction to the first root server, and the first root server forwards the first retrieval instruction to the first retrieval server at the first node. In an embodiment, if the first node further includes another retrieval server (for example, a second retrieval server), that is, both the first retrieval server and the second retrieval server belong to the first node and are connected to the first root server, in step S204, the scheduling server further sends the first retrieval instruction to the second retrieval server in the same manner as communication with the first retrieval server, so that the first retrieval server and the second retrieval server execute the same retrieval instruction.

In specific implementation, the first retrieval server performs face retrieval in a preset database. The preset database herein may include, but is not limited to the following types: a permanent resident population database, a temporary resident population database, user databases of various Internet applications, and the like. The Internet applications herein may include, but are not limited to, an instant messaging application, an online car-hailing application, a social networking services (SNS) application, a game application, and the like. The first retrieval server may load one or more types of the foregoing databases, and the obtained first retrieval result varies according to different types of the loaded databases. For example, if a permanent resident database is loaded, data of a corresponding permanent resident obtained after the first facial feature is retrieved may include: a name, an age, a gender, an identity, an archive photo, a permanent address and the like of the permanent resident. For another example, if a user database of an instant messaging application is loaded, corresponding user data obtained after the first facial feature is retrieved may include: an account, a nickname, a profile picture, registration time, a common login address and the like of the instant messaging application.

This embodiment describes the face retrieval process performed for a retrieval instruction. In an embodiment, the scheduling server may generate a plurality of retrieval instructions. In this case, one or more nodes, such as the first node and the second node, may be selected from the retrieval device cluster according to the load balancing rule, and then the plurality of retrieval instructions are evenly allocated to the retrieval servers at the selected nodes for collaborative execution. In addition, retrieval servers of the same node execute the same retrieval instruction. For example, in this embodiment, if the first node further includes the second retrieval server, the second retrieval server also executes the first retrieval instruction to obtain a retrieval result. In this case, if the first retrieval server and the second retrieval server load the same type of preset database, the two retrieval servers may obtain the same retrieval result, thereby achieving disaster tolerance of the face retrieval system. That is, when a fault occurs in the first retrieval server or the second retrieval server, the retrieval result may be obtained from the other retrieval server in which no fault occurs. If the first retrieval server and the second retrieval server load different types of preset databases, the two retrieval servers may obtain different retrieval results, thereby improving a retrieval capability of the face retrieval system. Collaborative execution performed by the two retrieval servers can improve retrieval efficiency, and ensure accuracy and comprehensiveness of the retrieval result.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

Figure 3:
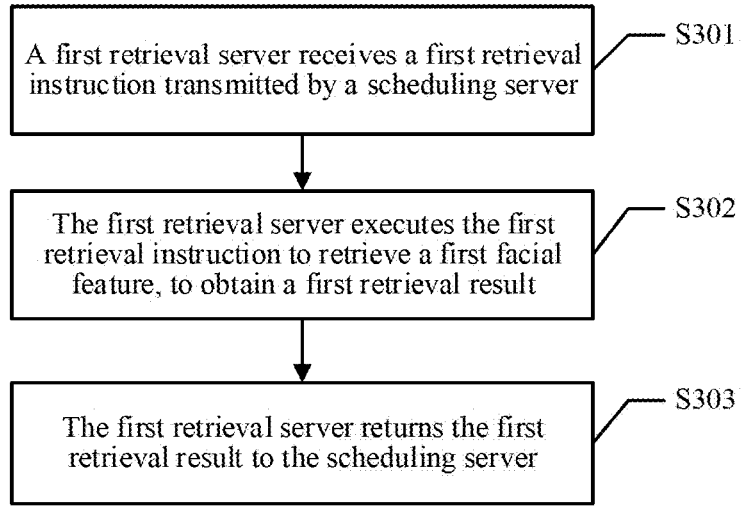
FIG. 3 is a flowchart of another face retrieval method according to an embodiment of the disclosure.

Based on the descriptions of the embodiments of the foregoing face retrieval system and face retrieval method, an embodiment of the disclosure provides another face retrieval method. The method may be applied to the face retrieval system shown in FIG. 1, and may be specifically performed by a first retrieval server 104a at the first node (for example, the node 1) shown in FIG. 1. Referring to FIG. 3, the method may include the following steps S301 to S303:

In step S301, a first retrieval server receives a first retrieval instruction transmitted by a scheduling server.

The first node includes the first retrieval server, and the first node refers to any node selected from the retrieval device cluster by the scheduling server according to a load balancing rule. After obtaining the first retrieval instruction, the scheduling server sends the first retrieval instruction to the first retrieval server. The first retrieval instruction carries a first facial feature. The first facial feature may be an eigenvalue sequence with preset dimensions. The preset dimensions may be 1024 dimensions, 512 dimensions, and the like. The first retrieval server may be any retrieval server at the first node. If a connection is directly established between the scheduling server and the first node, the scheduling server directly sends the first retrieval instruction to the first retrieval server of the first node. If the scheduling server is connected to the first node through a first root server, the scheduling server sends the first retrieval instruction to the first root server, and the first root server forwards the first retrieval instruction to the first retrieval server at the first node.

In step S302, the first retrieval server executes the first retrieval instruction to retrieve a first facial feature, to obtain a first retrieval result.

The first retrieval server performs face retrieval in a preset database to obtain the first retrieval result. The preset database herein may include, but is not limited to the following types: a permanent resident population database, a temporary resident population database, user databases of various Internet applications, and the like. The Internet applications herein may include, but are not limited to, an instant messaging application, an online car-hailing application, an SNS application, a game application, and the like. The first retrieval server may load one or more types of the foregoing databases, and the obtained first retrieval result varies according to different types of the loaded databases. For example, if a permanent resident database is loaded, data of a corresponding permanent resident obtained after the first facial feature is retrieved may include: a name, an age, a gender, an identity, an archive photo, a permanent address and the like of the permanent resident. For another example, if a user database of an instant messaging application is loaded, corresponding user data obtained after the first facial feature is retrieved may include: an account, a nickname, a profile picture, registration time, a common login address and the like of the instant messaging application.

In an embodiment, the preset database includes a plurality of reference features and data corresponding to each reference feature. A specific retrieval process of step S302 includes: matching the first facial feature with the reference features in the preset database, and obtaining first user data corresponding to a matching first reference feature from the preset database in a case that the matching is successful, where the matching herein may be determined by calculating similarity between the first facial feature and each reference feature, and if the similarity is greater than a preset similarity threshold, it is considered that the first facial feature matches the reference feature; otherwise, the first facial feature does not match the reference feature. It may be learned that the similarity between the matching first reference feature and the first facial feature is greater than the preset similarity threshold, and the first user data is user data corresponding to the first reference feature. A matching manner is not limited in this embodiment. For example, matching may also be performed by using a Euclidean distance, a Hamming distance or the like.

In another embodiment, to further improve face retrieval efficiency, a corresponding label may be further set for each reference feature in the preset database. That is, the preset database further stores a label attribute of each reference feature. The label attribute herein may include, but is not limited to: a gender, an age, a hobby, and the like. For example, a label attribute of a reference feature may include: male, 25 years old, sporty. Therefore, when matching is performed with the preset database in step S302, a target label attribute of the first facial feature is determined first. For example, the target label attribute of the first facial feature is: male, 25 years old. Secondly, the first retrieval server extracts a reference feature set corresponding to the target label attribute from the preset database. For example, all reference features having a label attribute of male are extracted, and all reference features having a label attribute of 25 years old are extracted. The first facial feature is matched with the reference features in the extracted reference feature set.

In still another embodiment, to further improve face retrieval efficiency, the preset database further stores a datum feature (or compressed feature) obtained after dimension reduction and/or precision compression is performed on each reference feature. For example, a 512-dimensional datum feature may be obtained after dimension reduction is performed on a 1024-dimensional reference feature. For another example, a datum feature represented by a 16-bit floating-point number may be obtained after precision compression is performed on a reference feature having precision of 32-bit floating-point number. In the matching process in step S302, the first retrieval server may perform dimension reduction and/or precision compression on the first facial feature, and then match the processed first facial feature with each datum feature in the preset database. In this embodiment, although the dimension and/or precision is sacrificed, the matching based on the obtained datum feature can effectively reduce storage pressure of an internal memory and improve a calculation speed and a retrieval speed.

In an embodiment, before performing step S302, the first retrieval server first loads the first facial feature into memory space. When a single server stores a to-be-retrieved facial feature into the memory space, the to-be-retrieved facial feature is discretely stored. For example, for a to-be-retrieved facial feature of 1024 dimensions, 512 dimensions may be stored into a region in the internal memory, another 256 dimensions may be stored into another region in the internal memory, and the remaining 256 dimensions are then stored into still another region. In this way, a respective index needs to be established for each region. When face retrieval is performed, corresponding stored content needs to be read a plurality of times by using the indexes to obtain the complete first facial feature. In this way, a throughput of the memory space is increased, which affects face retrieval efficiency. Based on this, in this embodiment, the first retrieval server allocates continuous storage space in the internal memory for the first facial feature according to the dimensions of the first facial feature, and loads the first facial feature into the allocated continuous storage space to store the first facial feature continuously. For example, for a 1024-dimensional first facial feature, the first retrieval server allocates 1024-dimensional continuous memory space to store the first facial feature, and establishes one index for the storage space of the first facial feature. In this way, when face retrieval is performed, the first facial feature may be obtained by using the one index. Compared with the discrete storage solution, the continuous storage solution in this embodiment of the disclosure can effectively reduce the throughput of the memory space and improve face retrieval efficiency.

In step S303, the first retrieval server returns the first retrieval result to the scheduling server.

The first retrieval result may include an indication that the retrieval succeeds or the retrieval fails. If the retrieval succeeds, the first retrieval result further includes data obtained through retrieval. After the first retrieval result is returned to the scheduling server, the scheduling server may return the first retrieval result to a terminal requesting retrieval, so that the terminal displays the first retrieval result.

This embodiment describes the face retrieval process performed by the first retrieval server for one retrieval instruction. In an embodiment, the first retrieval server may receive a plurality of retrieval instructions allocated by the scheduling server. For example, if two retrieval instructions are received, that is, if the first retrieval server further receives another retrieval instruction (a second retrieval instruction) sent by the scheduling server, in an embodiment, the first retrieval server may sequentially execute the retrieval instructions. To be specific, the first retrieval instruction is first executed according to the foregoing steps S301 to S303, and then the second retrieval instruction is executed according to the same steps to obtain a second retrieval result. In another embodiment, the first retrieval server may further combine the first retrieval instruction and the second retrieval instruction into a batch, and perform face retrieval in batches. A difference between a batch execution process (also referred to as a batch processing process) and a single execution process mainly lies in that: in step S301, after a single retrieval instruction is received, a subsequent procedure is not started immediately. Instead, the received single retrieval instruction may be cached first. When a quantity of received retrieval instructions reaches a specified value (for example, 1000 or 2000), or a preset period of time is reached (for example, a cache time reaches 2 seconds or 5 seconds), the cached retrieval instructions satisfying the set condition are combined into the same batch, and the procedure is then started. In addition, in step S302, facial features carried in the same batch of retrieval instructions are sequentially written into the internal memory, and then the facial features are read from the internal memory in a serial or parallel manner and face retrieval is performed. Through the foregoing batch processing setting, the throughput of the face retrieval system can be reduced, a throughput rate can be improved, and the face retrieval efficiency can be improved.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

Figure 4:
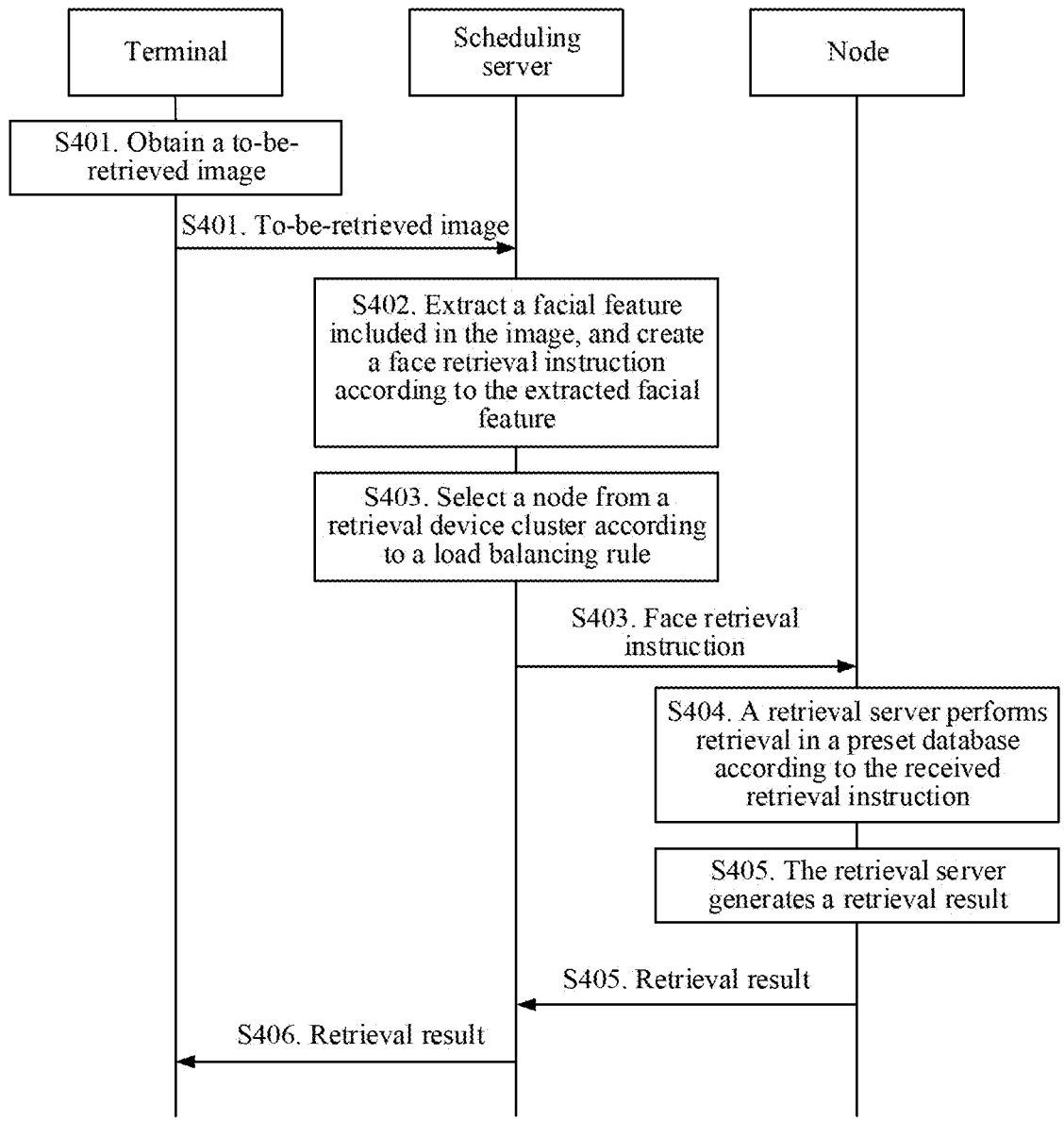
FIG. 4 is a flowchart of still another face retrieval method according to an embodiment of the disclosure.

Based on the descriptions of the embodiments of the foregoing face retrieval system and face retrieval method, an embodiment of the disclosure provides still another face retrieval method. The method may be applied to the face retrieval system shown in FIG. 1, and may be specifically performed by the terminal 101, the scheduling server 102, and the retrieval server 104 at the node shown in FIG. 1 interactively. Referring to FIG. 4, the method may include the following steps S401 to S406:

In step S401, a terminal obtains a to-be-retrieved image.

The terminal herein may be any one or more terminals shown in FIG. 1, and the to-be-retrieved image may be one or more images including a face. The terminal may obtain static pictures or dynamic video images captured in real time by a plurality of high-definition cameras or common surveillance cameras. The camera may be installed in each corner of a scenario having a relatively high safety requirement, for example, a bank, a defense agency, and an airport. After obtaining the to-be-retrieved image, the terminal sends the obtained to-be-retrieved image to a scheduling server.

In step S402, a scheduling server extracts a facial feature included in the image, and creates a face retrieval instruction according to the extracted facial feature.

The scheduling server extracts one or more facial features from the to-be-retrieved image, and creates one retrieval instruction for each facial feature. For example, the scheduling server receives eight million images sent by the terminal, extracts ten million facial features from the images, and correspondingly creates ten million retrieval instructions. In an embodiment, each facial feature is a 1024-dimensional eigenvalue sequence.

In step S403, the scheduling server selects a node from a retrieval device cluster according to a load balancing rule, and allocates the retrieval instruction to the selected node.

The load balancing rule herein may be that a ratio of a current load to a maximum load of each node is less than a preset threshold. The scheduling server may select one or more nodes, where each node includes one or more retrieval servers. The retrieval instructions are finally allocated to the retrieval servers at the selected nodes. A specific allocation rule may be making load values of the nodes tend to be equal. For example, a first node, a second node, and a third node are selected. Among the foregoing ten million retrieval instructions, four million retrieval instructions are allocated to the first node, four million retrieval instructions are allocated to the second node, and last two million retrieval instructions are allocated to the third node.

In step S404, a retrieval server at each node performs retrieval in a preset database according to the received retrieval instruction.

In step S405, the retrieval server generates a retrieval result and returns the retrieval result to the scheduling server.

In step S406, the scheduling server returns the retrieval result to the terminal.

For a specific face retrieval process performed by each retrieval server in steps S404 to S406, reference is made to the descriptions in the embodiment shown in FIG. 3, and details are not described herein again. In an embodiment, after receiving the retrieval results returned by the retrieval servers, the scheduling server may send, in real time, the received retrieval results to the terminal one by one for display, or may combine some or all of the retrieval results and then send the combined retrieval results to the terminal for display.

An application process of the face retrieval method in this embodiment of the disclosure in a specific scenario is described below with reference to FIG. 5 and FIG. 6.

Figure 5:
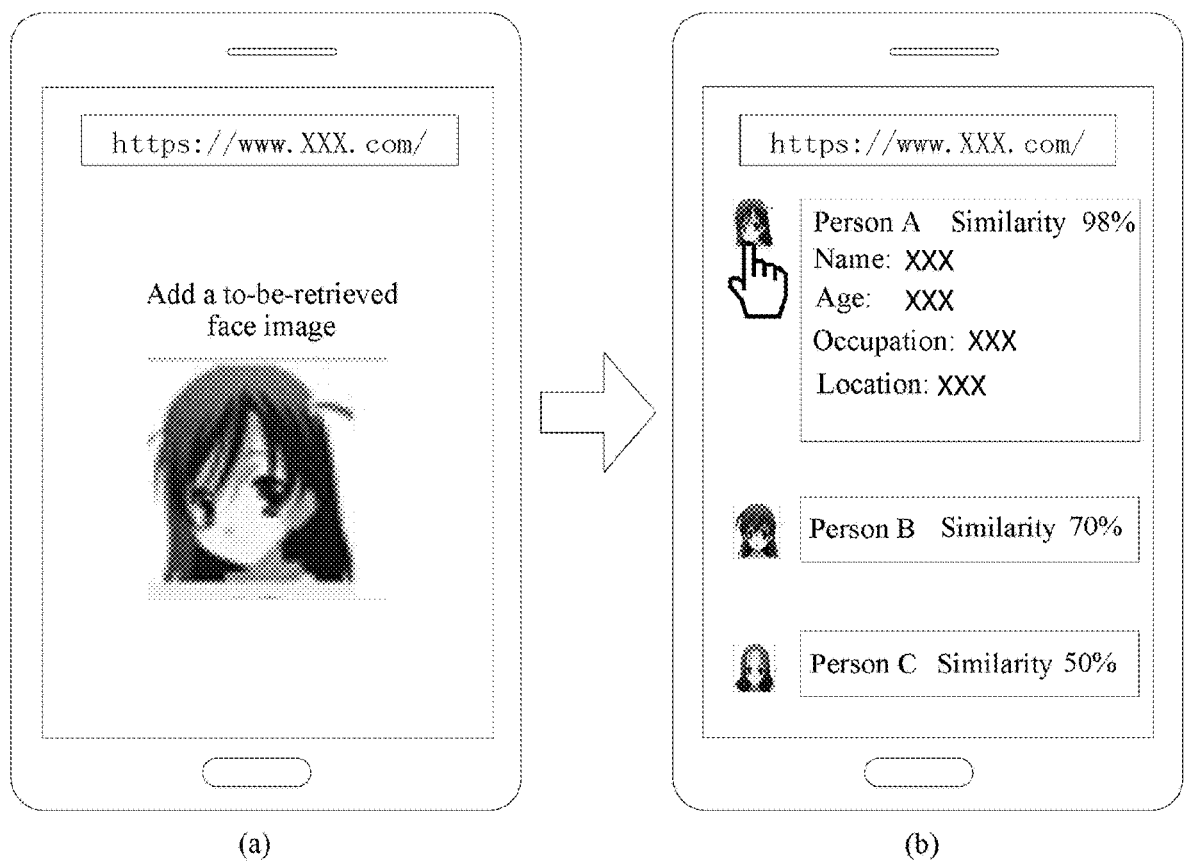
FIG. 5 is a diagram of an application scenario of face retrieval according to an embodiment of the disclosure.

FIG. 5 shows a face retrieval scenario. As shown in FIG. 5(a), a terminal outputs a web page, and prompts a user to add a to-be-retrieved face image in the web page. The user may invoke the camera to temporarily take a face image, or may select a stored face image from storage space of the terminal, or may download a face image from the Internet. After the user adds a to-be-retrieved face image to the web page, the terminal obtains the to-be-retrieved face image, and sends the to-be-retrieved face image to a scheduling server. The scheduling server performs feature extraction on the to-be-retrieved face image, and evenly allocates extracted facial features to retrieval servers at nodes in a retrieval device cluster. The retrieval servers perform face retrieval to obtain a retrieval result, and return the retrieval result to the scheduling server. The scheduling server returns the retrieval result to the terminal. The terminal displays the retrieval result shown in FIG. 5(b) on the web page.

Figure 6:
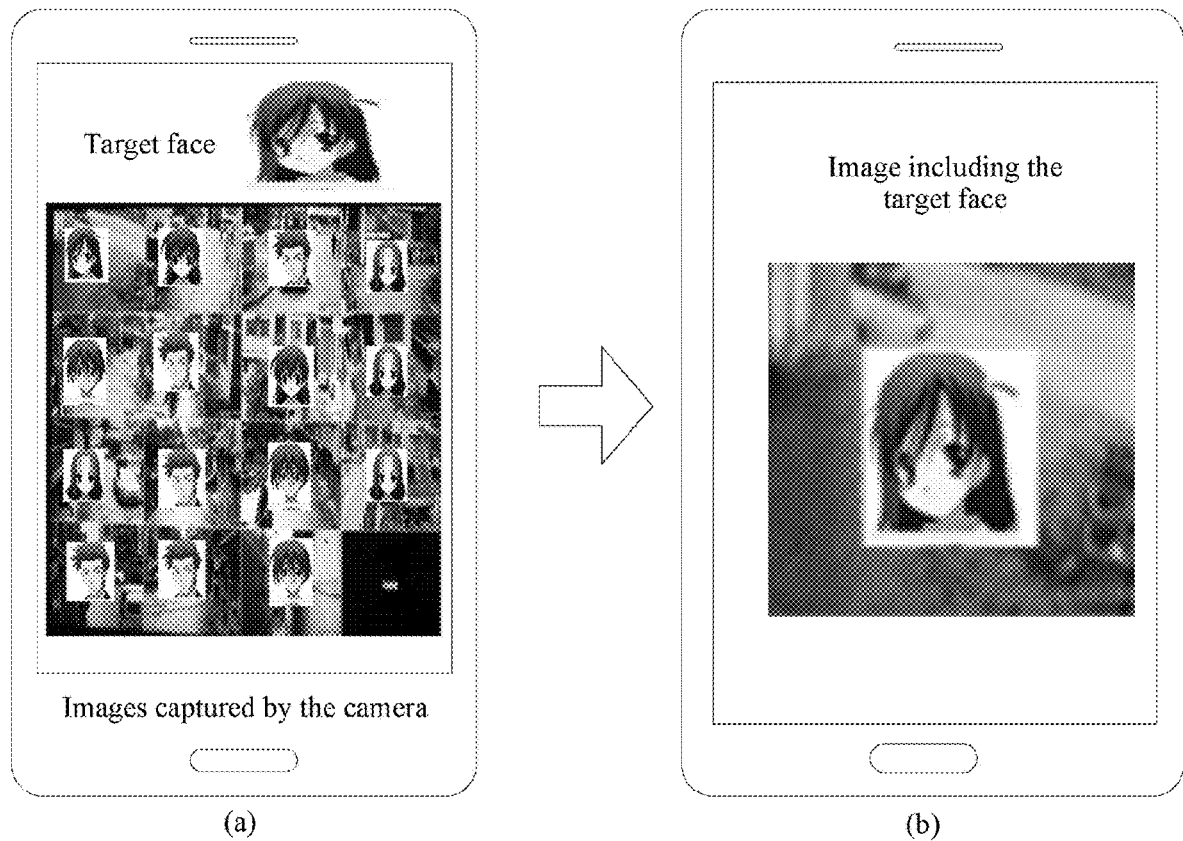
FIG. 6 is a diagram of another application scenario of face retrieval according to an embodiment of the disclosure.

FIG. 6 shows another face retrieval scenario. As shown in FIG. 6(a), a target face needs to be located. The target face may be the face of a suspect in a preset criminal suspect database. Cameras distributed in various surveillance regions return images including a plurality of faces. After acquiring the images including the plurality of faces, the terminal transmits the images to the scheduling server. The scheduling server sequentially performs feature extraction on the plurality of faces, and evenly allocates extracted facial features to the retrieval servers at the nodes in the retrieval device cluster. The retrieval servers perform face retrieval in the preset criminal suspect database to obtain a retrieval result, and return the retrieval result to the scheduling server. The scheduling server returns the retrieval result to the terminal. As shown in FIG. 6, assuming that the retrieval result is that the retrieval succeeds, which indicates that the target suspect appears in a surveillance region, the terminal displays a retrieval result shown in FIG. 6(b), so that it can be determined that the target suspect appears in the surveillance region, thereby facilitating handling of the target suspect.

The foregoing face retrieval scenarios are merely examples. The face retrieval solution provided in this embodiment of the disclosure is applicable to both a retrieval scenario of a single face and a retrieval scenario of a massive quantity of faces, and has advantages such as high disaster tolerance and high retrieval efficiency. Therefore, the solution may be applied to a wide range of Internet scenarios. For example, the solution may further be compatible with related applications such as face unlocking and face door-opening. The solution has high practicability.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval processing, and improving the speed of face retrieval.

Figure 7:
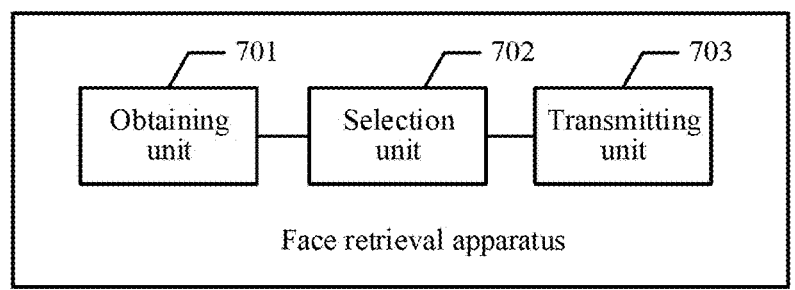
FIG. 7 is a structural diagram of a face retrieval apparatus according to an embodiment of the disclosure.

Based on the descriptions of the foregoing embodiments of the face retrieval method, an embodiment of the disclosure further discloses a face retrieval apparatus. The face retrieval apparatus may be applied to the face retrieval system shown in FIG. 1. Specifically, the face retrieval apparatus may run on the scheduling server 102 in the face retrieval system shown in FIG. 1. The face retrieval apparatus may be a computer program (including program code) run on the scheduling server, or may be a physical apparatus included in the scheduling server. The face retrieval apparatus may perform the method shown in FIG. 2. Referring to FIG. 7, the face retrieval apparatus runs the following units. An obtaining unit 701 is configured to acquire a to-be-retrieved face image, parse the face image to obtain a first facial feature, and generate a first retrieval instruction according to the first facial feature, the first retrieval instruction carrying the first facial feature. A selection unit 702 is configured to select a first node from the retrieval device cluster according to a load balancing rule, the first node including a first retrieval server. A transmitting unit 703 is configured to transmit the first retrieval instruction to the first retrieval server, to trigger the first retrieval server to execute the first retrieval instruction to retrieve the first facial feature, to obtain a first retrieval result.

In an embodiment, the retrieval device cluster further includes a first root server, the first node belongs to the first root server, and the transmitting unit 703 is specifically configured to transmit the first retrieval instruction to the first root server. The transmitting unit 703 is also configured to control the first root server to distribute the first retrieval instruction to the first retrieval server, to trigger the first retrieval server to execute the first retrieval instruction to retrieve the first facial feature, to obtain the first retrieval result.

In another embodiment, the first node further includes a second retrieval server, and the transmitting unit 703 is further configured to control the first root server to distribute the first retrieval instruction to the second retrieval server, to trigger the second retrieval server to execute the first retrieval instruction to retrieve the first facial feature, to obtain a second retrieval result.

In still another embodiment, the selection unit 702 is specifically configured to obtain a load value of each node in the retrieval device cluster. The selection unit 702 is also configured to select, from the retrieval device cluster, a first node whose load value is less than a preset threshold.

In still another embodiment, the selection unit 702 is specifically configured to select, from the retrieval device cluster, a first node whose load value is less than a preset threshold.

In still another embodiment, the obtaining unit 701 is further configured to obtain a second retrieval instruction, the second retrieval instruction carrying a second facial feature. The selection unit 702 is further configured to select a second node from the retrieval device cluster according to the load balancing rule, the second node including a third retrieval server. The transmitting unit 703 is further configured to allocate the second retrieval instruction to the third retrieval server, to trigger the third retrieval server to execute the second retrieval instruction to retrieve the second facial feature, to obtain a third retrieval result.

In still another embodiment, the transmitting unit 703 is further configured to return at least one of the first retrieval result, the second retrieval result, and the third retrieval result to a terminal for output.

According to an embodiment of the disclosure, the steps in the method shown in FIG. 2 may be performed by the units of the face retrieval apparatus shown in FIG. 7. For example, steps S201 and S202, S203, and S204 shown in FIG. 2 may be respectively performed by the obtaining unit 701, the selection unit 702, and the transmitting unit 703 shown in FIG. 7.

According to another embodiment of the disclosure, some or all of the units of the face retrieval apparatus shown in FIG. 7 may be combined into one or several other units, or one (or some) of the units may further be divided into multiple smaller functional units. In this way, same operations can be implemented without affecting implementation of the technical effects of the embodiments of the disclosure. The foregoing units are divided based on logical functions. In an embodiment, a function of one unit may also be implemented by multiple units, or functions of multiple units are implemented by one unit. In other embodiments of the disclosure, the face retrieval apparatus may also include other units. In an embodiment, the functions may also be cooperatively implemented by other units and may be cooperatively implemented by multiple units.

According to another embodiment of the disclosure, a computer program (including program code) that can perform the steps in the corresponding method shown in FIG. 2 may run on a general computing device (processing circuitry), such as a computer, which include processing elements and storage elements such as a central processing unit (CPU), a random access memory (RAM), and a read-only memory (ROM), to construct the face retrieval apparatus shown in FIG. 7, and implement the face retrieval method in the embodiments of the disclosure. The computer program may be recorded in, for example, a computer-readable storage medium, and may be loaded into the foregoing computing device by using the computer-readable storage medium, and run on the computing device.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

Figure 8A:
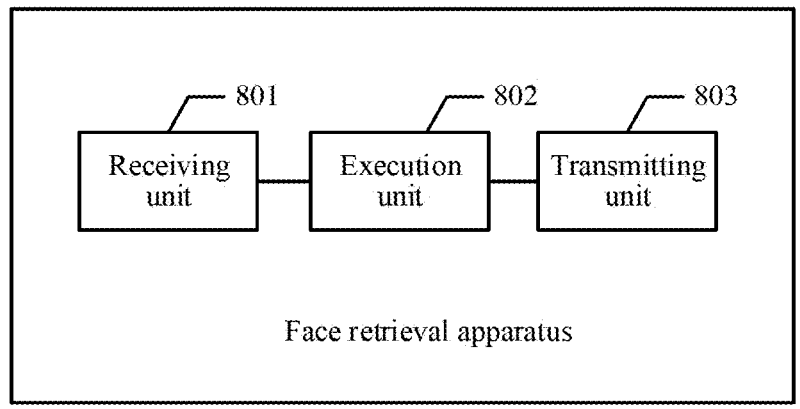
FIG. 8A is a structural diagram of another face retrieval apparatus according to an embodiment of the disclosure.

Based on the descriptions of the foregoing embodiments of the face retrieval method, another embodiment of the disclosure further discloses a face retrieval apparatus. The face retrieval apparatus may be applied to the face retrieval system shown in FIG. 1. Specifically, the face retrieval apparatus may run on any retrieval server 104 at any node in the face retrieval system shown in FIG. 1. The face retrieval apparatus may be a computer program (including program code) run on the retrieval server, or may be a physical apparatus included in the retrieval server. The face retrieval apparatus may perform the method shown in FIG. 3. Referring to FIG. 8A, the face retrieval apparatus runs the following units. A receiving unit 801 is configured to receive a first retrieval instruction transmitted by a scheduling server, the first retrieval instruction carrying a first facial feature, the first retrieval instruction being generated by the scheduling server according to the first facial feature after acquiring a to-be-retrieved face image and parsing the face image to obtain the first facial feature, and the first retrieval instruction being transmitted after the scheduling server selects a first node from the retrieval device cluster according to a load balancing rule. An execution unit 802 is configured to execute the first retrieval instruction to retrieve the first facial feature, to obtain a first retrieval result. A transmitting unit 803 is configured to return the first retrieval result to the scheduling server.

In an embodiment, the execution unit 802 is specifically configured to match the first facial feature with each reference feature in a preset database, the preset database including at least one reference feature and user data corresponding to each reference feature. The execution unit 802 is further configured to obtain, from the preset database, first user data corresponding to a matching first reference feature in a case that the matching is successful. Finally, the execution unit 802 is configured to generate a first retrieval result, the first retrieval result including the first user data.

In another embodiment, the preset database further includes a label attribute of each reference feature, and the execution unit 802 is specifically configured to determine a target label attribute of the first facial feature. The execution unit 802 is configured to extract, from the preset database, a reference feature set corresponding to the target label attribute, and match the first facial feature with each reference feature in the extracted reference feature set.

In still another embodiment, the preset database further includes a datum feature (compressed feature) obtained after dimension reduction and/or precision compression is performed on each reference feature, and the execution unit 802 is specifically configured to perform dimension reduction and/or precision compression on the first facial feature. The execution unit 802 is configured to match the processed first facial feature with each datum feature in the preset database.

Figure 8B:
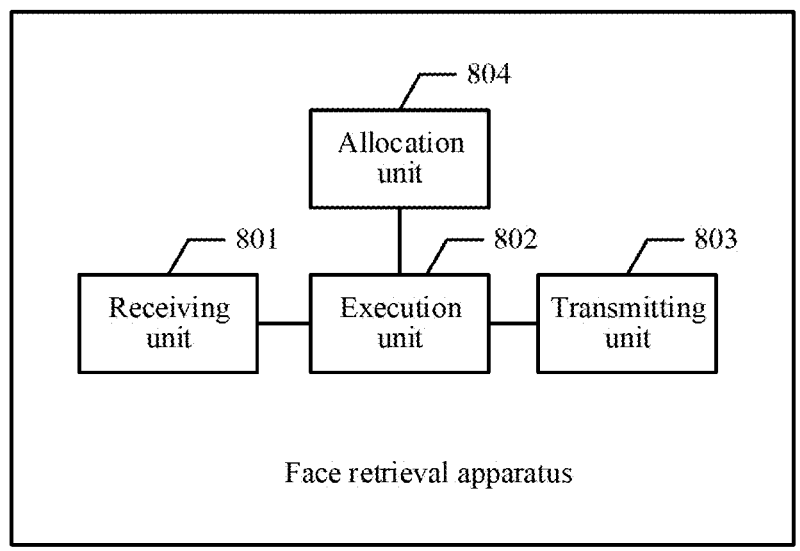
FIG. 8B is a structural diagram of still another face retrieval apparatus according to an embodiment of the disclosure.

In still another embodiment, the retrieval server further includes an allocation unit 804, as shown in FIG. 8B. The allocation unit 804 is specifically configured to allocate continuous storage space in an internal memory according to dimensions of the first facial feature, and load the first facial feature into the allocated continuous storage space.

In still another embodiment, the allocation unit 804 is further configured to combine, in a case that a second retrieval instruction transmitted by the scheduling server is received, the first retrieval instruction and the second retrieval instruction into a batch. The execution unit 802 then performs face retrieval in batches.

According to an embodiment of the disclosure, the steps in the method shown in FIG. 3 may be performed by the units of the face retrieval apparatuses shown in FIG. 8A and FIG. 8B. For example, steps S301, S302, and S303 shown in FIG. 3 may be respectively performed by the receiving unit 801, the execution unit 802, and the transmitting unit 803 shown in FIG. 8A and FIG. 8B.

According to another embodiment of the disclosure, some or all of the units of the face retrieval apparatuses shown in FIG. 8A and FIG. 8B may be combined into one or several other units, or one (or some) of the units may further be divided into multiple smaller functional units. In this way, same operations can be implemented without affecting implementation of the technical effects of the embodiments of the disclosure. The foregoing units are divided based on logical functions. In an embodiment, a function of one unit may also be implemented by multiple units, or functions of multiple units are implemented by one unit. In other embodiments of the disclosure, the face retrieval apparatus may also include other units. In an embodiment, the functions may also be cooperatively implemented by other units and may be cooperatively implemented by multiple units.

According to another embodiment of the disclosure, a computer program (including program code) that can perform the steps in the corresponding method shown in FIG. 3 may run on a general computing device (processing circuitry), such as a computer, which includes processing elements and storage elements such as a central processing unit (CPU), a random access memory (RAM), and a read-only memory (ROM), to construct the face retrieval apparatuses shown in FIG. 8A and FIG. 8B, and implement the face retrieval method in the embodiments of the disclosure. The computer program may be recorded in, for example, a computer-readable storage medium, and may be loaded into the foregoing computing device by using the computer-readable storage medium, and run on the computing device.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

Figure 9:
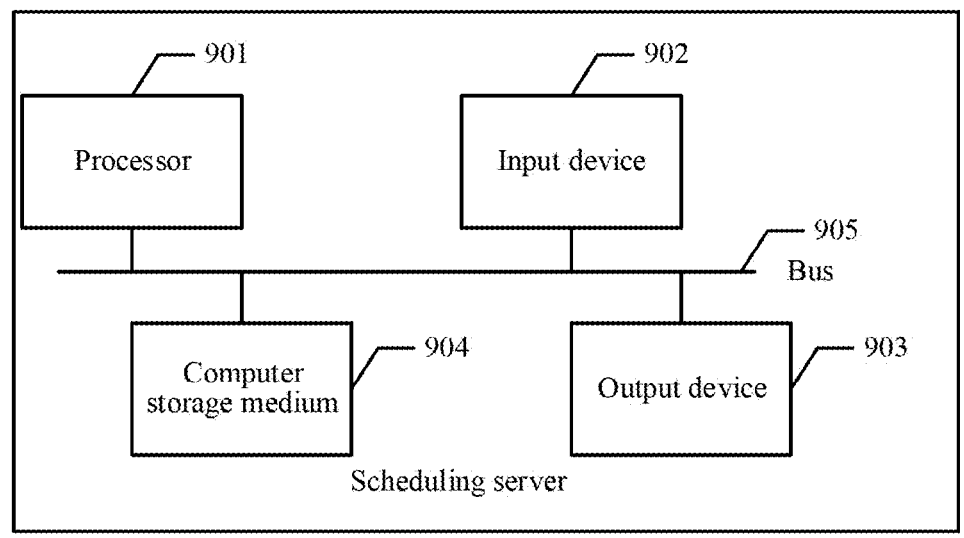
FIG. 9 is a structural diagram of a scheduling server according to an embodiment of the disclosure.

Based on the descriptions of the foregoing method embodiment and apparatus embodiment, an embodiment of the disclosure further provides a scheduling server. The scheduling server may be applied to the face retrieval system shown in FIG. 1. Referring to FIG. 9, an internal structure of the scheduling server includes at least a processor 901, an input device 902, an output device 903, and a non-transitory computer storage medium 904. The processor 901, the input device 902, the output device 903, and the computer storage medium 904 of the scheduling server may be connected by using a bus or in another manner. In FIG. 9 shown in this embodiment of the disclosure, a connection by using a bus 905 is used as an example.

The non-transitory computer storage medium 904 is configured to store a computer program. The computer program includes a program instruction. The processor 901 is configured to execute the program instruction stored in the computer storage medium 904. The processor 901 (or referred to as a central processing unit (CPU)) is a computing core and a control core of the scheduling server, and is suitable for implementing one or more instructions. Specifically, the processor 901 is suitable for loading and executing one or more instructions, to implement a corresponding method process or a corresponding function. In an embodiment, the processor 901 in this embodiment of the disclosure may be configured to acquire a to-be-retrieved face image, and parse the face image to obtain a first facial feature. The processor 901 may also be configured to generate a first retrieval instruction according to the first facial feature, select a first node from the retrieval device cluster according to a load balancing rule, and transmit the first retrieval instruction to the first retrieval server, to trigger the first retrieval server to execute the first retrieval instruction to retrieve the first facial feature, to obtain a first retrieval result.

This embodiment of the disclosure further provides a non-transitory computer storage medium (memory). The computer storage medium is a memory device in the scheduling server and is configured to store a program and data. In an embodiment, the computer storage medium may include an internal storage medium of the scheduling server, and certainly may also include an extended storage medium supported by the scheduling server. The computer storage medium provides storage space, and the storage space stores an operating system of a terminal. In addition, the storage space further stores one or more instructions suitable to be loaded and executed by the processor 901. The instructions may be one or more computer programs (including program code). The computer storage medium herein may be a high-speed RAM or a non-volatile memory, for example, at least one magnetic disk memory. Optionally, the computer storage medium may be at least one computer storage medium located away from the foregoing processor.

In an embodiment, the processor 901 may load and execute one or more first instructions stored in the computer storage medium, to implement corresponding steps of the face retrieval method in the foregoing embodiments. During specific implementation, the one or more first instructions in the computer storage medium are loaded by the processor 901 to perform the following steps. The processor 901 may perform acquiring a to-be-retrieved face image, parsing the face image to obtain a first facial feature, and generating a first retrieval instruction according to the first facial feature, the first retrieval instruction carrying the first facial feature. The processor 901 may also perform selecting a first node from the retrieval device cluster according to a load balancing rule, the first node including a first retrieval server, and transmitting the first retrieval instruction to the first retrieval server, to trigger the first retrieval server to execute the first retrieval instruction to retrieve the first facial feature, to obtain a first retrieval result.

In another embodiment, the retrieval device cluster further includes a first root server, and the first node belongs to the first root server. During the transmitting the first retrieval instruction to the first retrieval server, to trigger the first retrieval server to execute the first retrieval instruction to retrieve the first facial feature, to obtain a first retrieval result, the one or more first instructions are loaded by the processor 901 to specifically perform the following steps. The processor 901 may perform transmitting the first retrieval instruction to the first root server, and controlling the first root server to distribute the first retrieval instruction to the first retrieval server, to trigger the first retrieval server to execute the first retrieval instruction to retrieve the first facial feature, to obtain the first retrieval result.

In still another embodiment, the first node further includes a second retrieval server, and after the transmitting the first retrieval instruction to the first root server, the one or more first instructions are loaded by the processor 901 to further perform the following steps. The processor 901 may perform controlling the first root server to distribute the first retrieval instruction to the second retrieval server, to trigger the second retrieval server to execute the first retrieval instruction to retrieve the first facial feature, to obtain a second retrieval result.

In still another embodiment, during the selecting a first node from the retrieval device cluster according to a load balancing rule, the one or more first instructions are loaded by the processor 901 to specifically perform the following steps. The processor 901 may perform obtaining a load value of each node in the retrieval device cluster, and selecting, from the retrieval device cluster, a first node whose load value is less than a preset threshold.

In still another embodiment, the one or more first instructions are loaded by the processor 901 to further perform the following steps. The processor 901 may perform obtaining a second retrieval instruction, the second retrieval instruction carrying a second facial feature, and selecting a second node from the retrieval device cluster according to the load balancing rule, the second node including a third retrieval server. The processor 901 may perform allocating the second retrieval instruction to the third retrieval server, to trigger the third retrieval server to execute the second retrieval instruction to retrieve the second facial feature, to obtain a third retrieval result.

In still another embodiment, the one or more first instructions are loaded by the processor 901 to further perform returning at least one of the first retrieval result, the second retrieval result, and the third retrieval result to a terminal for output.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

Figure 10:
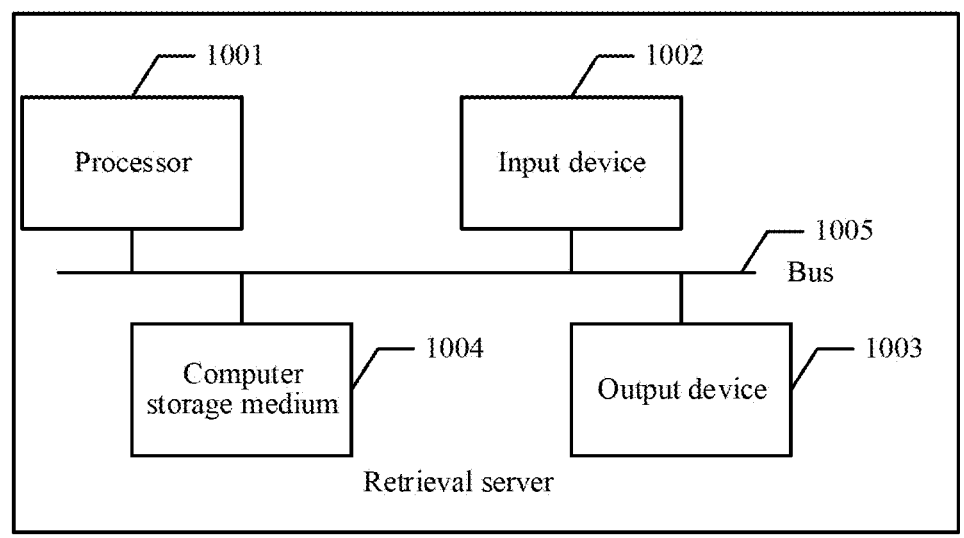
FIG. 10 is a structural diagram of a retrieval server according to an embodiment of the disclosure.

Based on the descriptions of the foregoing method embodiment and apparatus embodiment, an embodiment of the disclosure further provides a retrieval server. The retrieval server may be applied to the face retrieval system shown in FIG. 1. Specifically, the retrieval server may be any retrieval server at any node in the face retrieval system shown in FIG. 1. Referring to FIG. 10, an internal structure of the retrieval server includes at least a processor 1001, an input device 1002, an output device 1003, and a non-transitory computer storage medium 1004. The processor 1001, the input device 1002, the output device 1003, and the computer storage medium 1004 of the retrieval server may be connected by using a bus or in another manner. In FIG. 10 shown in this embodiment of the disclosure, a connection by using a bus 1005 is used as an example.

The non-transitory computer storage medium 1004 is configured to store a computer program. The computer program includes a program instruction. The processor 1001 is configured to execute the program instruction stored in the computer storage medium 1004. The processor 1001 (or referred to as a central processing unit (CPU)) is a computing core and a control core of the retrieval server, and is suitable for implementing one or more instructions. Specifically, the processor 1001 is suitable for loading and executing one or more instructions, to implement a corresponding method process or a corresponding function. In an embodiment, the processor 1001 in this embodiment of the disclosure may be configured to receive a first retrieval instruction transmitted by a scheduling server, the first retrieval instruction carrying a first facial feature, and the first retrieval instruction being obtained by the scheduling server and transmitted after a first node is selected from the retrieval device cluster according to a load balancing rule. The processor 1001 may also be configured to execute the first retrieval instruction to retrieve the first facial feature, to obtain a first retrieval result; return the first retrieval result to the scheduling server; and the like.

This embodiment of the disclosure further provides a non-transitory computer storage medium (memory). The computer storage medium is a memory device in the retrieval server and is configured to store a program and data. In an embodiment, the computer storage medium may include an internal storage medium of the retrieval server, and certainly may also include an extended storage medium supported by the retrieval server. The computer storage medium provides storage space, and the storage space stores an operating system of the retrieval server. In addition, the storage space further stores one or more instructions suitable to be loaded and executed by the processor 1001. The instructions may be one or more computer programs (including program code). The computer storage medium herein may be a high speed RAM or a non-volatile memory, for example, at least one magnetic disk memory. Optionally, the computer storage medium may be at least one computer storage medium located away from the foregoing processor.

In an embodiment, the processor 1001 may load and execute one or more second instructions stored in the computer storage medium, to implement corresponding steps of the face retrieval method in the foregoing embodiments. During specific implementation, the one or more second instructions in the computer storage medium are loaded by the processor 1001 to perform the following steps. The processor 1001 may perform receiving a first retrieval instruction transmitted by a scheduling server, the first retrieval instruction carrying a first facial feature, the first retrieval instruction being generated by the scheduling server according to the first facial feature after acquiring a to-be-retrieved face image and parsing the face image to obtain the first facial feature, and the first retrieval instruction being transmitted after the scheduling server selects a first node from the retrieval device cluster according to a load balancing rule. The processor 1001 may also perform executing the first retrieval instruction to retrieve the first facial feature, to obtain a first retrieval result; and returning the first retrieval result to the scheduling server.

In an embodiment, during the executing the first retrieval instruction to retrieve the first facial feature, to obtain a first retrieval result, the one or more second instructions are loaded by the processor 1001 to specifically perform the following steps. The processor 1001 may perform matching the first facial feature with each reference feature in a preset database, the preset database including at least one reference feature and user data corresponding to each reference feature. The processor 1001 may also perform obtaining, from the preset database, first user data corresponding to a matching first reference feature in a case that the matching is successful, and generating a first retrieval result, the first retrieval result including the first user data.

In another embodiment, the preset database further includes a label attribute of each reference feature; and during the matching the first facial feature with each reference feature in a preset database, the one or more second instructions are loaded by the processor 1001 to specifically perform the following steps. The processor 1001 may perform determining a target label attribute of the first facial feature, extracting, from the preset database, a reference feature set corresponding to the target label attribute, and matching the first facial feature with each reference feature in the extracted reference feature set.

In still another embodiment, the preset database further includes a datum feature obtained after dimension reduction and/or precision compression is performed on each reference feature. During the matching the first facial feature with each reference feature in a preset database, the one or more second instructions are loaded by the processor 1001 to specifically perform the following steps. The processor 1001 may perform performing dimension reduction and/or precision compression on the first facial feature, and matching the processed first facial feature with each datum feature in the preset database.

In still another embodiment, before the executing the first retrieval instruction to retrieve the first facial feature, to obtain a first retrieval result, the one or more second instructions are loaded by the processor 1001 to further perform the following steps. The processor 1001 may perform allocating continuous storage space in an internal memory according to dimensions of the first facial feature, and loading the first facial feature into the allocated continuous storage space.

In still another embodiment, after the receiving a first retrieval instruction transmitted by a scheduling server, the one or more second instructions are loaded by the processor 1001 to further perform the following steps. The processor 1001 may perform combining, in a case that a second retrieval instruction transmitted by the scheduling server is received, the first retrieval instruction and the second retrieval instruction into a batch, and performing face retrieval in batches.

This embodiment of the disclosure may be applied to a face retrieval system including a retrieval device cluster. The retrieval device cluster includes at least one node. After a to-be-retrieved face image is parsed to obtain a first facial feature, and a first retrieval instruction is generated according to the first facial feature, a first node may be selected from the retrieval device cluster according to a load balancing rule, and the first retrieval instruction is sent to a first retrieval server included in the first node, to trigger the first retrieval server to execute the first retrieval instruction to retrieve the first facial feature, to obtain a first retrieval result. Performing face retrieval by using the retrieval device cluster can effectively improve disaster tolerance of the entire face retrieval system. Even if retrieval servers of some nodes in the retrieval device cluster fail, normal operation of the entire face retrieval system may still be ensured. In addition, face retrieval efficiency of the entire face retrieval system may be improved by adding a node in the retrieval device cluster or adding a retrieval server at a node, thereby improving expandability of the entire face retrieval system, resolving a problem of a limited processing speed in the face retrieval process, and improving the speed of face retrieval.

The foregoing descriptions provide embodiments of the disclosure, and certainly are not intended to limit the protection scope of the disclosure. Therefore, equivalent variations made in accordance with the claims shall fall within the scope of the disclosure.

The invention claimed is:

1. A face retrieval method, applied to a face retrieval system, the face retrieval system comprising a retrieval device cluster, the retrieval device cluster comprising at least one node, the method being performed by a computing device and comprising:
    acquiring a face image, and parsing the face image to obtain a first facial feature;
    generating, by processing circuitry of the computing device, a first retrieval instruction according to the first facial feature, the first retrieval instruction carrying the first facial feature;
    selecting, by the processing circuitry of the computing device, a first node from the retrieval device cluster according to a load balancing rule, the first node comprising a first retrieval server; and
    transmitting the first retrieval instruction to the first retrieval server, wherein the first retrieval instruction causes the first retrieval server to obtain a first retrieval result by executing the first retrieval instruction.

2. The method according to claim 1, wherein the retrieval device cluster further comprises a first root server, and the first node belongs to the first root server; and
    the transmitting comprises:
    transmitting the first retrieval instruction to the first root server; and
    controlling the first root server to distribute the first retrieval instruction to the first retrieval server, wherein the first retrieval instruction causes the first retrieval server to obtain the first retrieval result by executing the first retrieval instruction.

3. The method according to claim 2, wherein the first node further comprises a second retrieval server; and
    after the transmitting the first retrieval instruction to the first root server, the method further comprises:
    controlling the first root server to distribute the first retrieval instruction to the second retrieval server, wherein the first retrieval instruction causes the second retrieval server to obtain a second retrieval result by executing the first retrieval instruction.

4. The method according to claim 1, wherein the selecting comprises:
    obtaining a load value of each node in the retrieval device cluster; and
    selecting, from the retrieval device cluster, the first node having a load value that is less than a threshold.

5. The method according to claim 3, further comprising:
    obtaining a second retrieval instruction, the second retrieval instruction carrying a second facial feature;

selecting a second node from the retrieval device cluster according to the load balancing rule, the second node comprising a third retrieval server;

allocating the second retrieval instruction to the third retrieval server, wherein the second retrieval instruction causes the third retrieval server to obtain a third retrieval result by executing the second retrieval instruction; and returning at least one of the first retrieval result, the second retrieval result, and the third retrieval result to a terminal for output.

6. A face retrieval method, applied to a face retrieval system, the face retrieval system comprising a retrieval device cluster, the retrieval device cluster comprising at least a first node, the first node comprising a first retrieval server, the method being performed by the first retrieval server and comprising:

receiving a first retrieval instruction transmitted by a scheduling server, the first retrieval instruction carrying a first facial feature, the first retrieval instruction being generated by the scheduling server according to the first facial feature after acquiring a face image and parsing the face image to obtain the first facial feature, and the first retrieval instruction being transmitted after the scheduling server selects the first node from the retrieval device cluster according to a load balancing rule;

executing, by processing circuitry of the first retrieval server, the first retrieval instruction to obtain a first retrieval result; and returning the first retrieval result to the scheduling server.

7. The method according to claim 6, wherein the executing comprises:

matching the first facial feature with each reference feature in a database, the database comprising at least one reference feature and user data corresponding to each reference feature;

obtaining, from the database, first user data corresponding to a reference feature in the database matching the first facial feature in a case that the reference feature matching the first facial feature is found among the at least one reference feature in the database; and generating the first retrieval result, the first retrieval result comprising the first user data.

8. The method according to claim 7, wherein the database further comprises a label attribute of each reference feature; and the matching comprises:
determining a target label attribute of the first facial feature;
extracting, from the database, a reference feature set corresponding to the target label attribute; and
matching the first facial feature with each reference feature in the extracted reference feature set.

9. The method according to claim 7, wherein the database further comprises at least one compressed feature obtained after dimension reduction and/or precision compression is performed on each reference feature; and the matching comprises:
performing the dimension reduction and/or the precision compression on the first facial feature to generate a processed first facial feature; and
identifying, in the database, a compressed feature matching the processed first facial feature.

10. The method according to claim 6, wherein, before the executing the first retrieval instruction, the method further comprises:

allocating continuous storage space in an internal memory according to dimensions of the first facial feature; and
loading the first facial feature into the allocated continuous storage space for continuous storage.

11. The method according to claim 6, wherein, after the receiving the first retrieval instruction transmitted by the scheduling server, the method further comprises:

combining, in a case that a second retrieval instruction transmitted by the scheduling server is received, the first retrieval instruction and the second retrieval instruction into a batch; and
performing face retrieval in batches.

12. A face retrieval apparatus, applied to a face retrieval system, the face retrieval system comprising a retrieval device cluster, the retrieval device cluster comprising at least one node, the apparatus comprising:

processing circuitry configured to
acquire a face image, parse the face image to obtain a first facial feature, and generate a first retrieval instruction including the first facial feature;
select a first node from the retrieval device cluster according to a load balancing rule, the first node comprising a first retrieval server; and
transmit the first retrieval instruction to the first retrieval server, wherein the first retrieval instruction causes the first retrieval server to obtain a first retrieval result by executing the first retrieval instruction.

13. A scheduling server, comprising:
a processor, configured to implement one or more instructions; and
a non-transitory computer storage medium, storing one or more instructions, the one or more instructions causing the processor to perform the face retrieval method according to claim 1.

14. A retrieval server, comprising:
a processor, configured to implement one or more instructions; and
a non-transitory computer storage medium, storing one or more instructions, the one or more instructions causing the processor to perform the face retrieval method according to claim 6.

15. A non-transitory computer-readable storage medium, storing machine-readable instructions, the machine-readable instructions being executable by a processor to perform the face retrieval method according to claim 1.

16. A non-transitory computer-readable storage medium, storing machine-readable instructions, the machine-readable instructions being executable by a processor to perform the face retrieval method according to claim 6.

17. The method according to claim 4, wherein the obtaining the load value of each node in the retrieval device cluster comprises:

establishing a dynamic load table indicating the load value of each node in the retrieval device cluster;
updating the dynamic load table to reflect current load distribution by repeatedly determining, for each node
a load value of each of one or more retrieval servers in the respective node, and
the load value of the respective node by averaging the load values of the one or more retrieval servers in the respective node; and
obtaining the load value of each node in the retrieval device cluster from the dynamic load table.

18. The method according to claim 6, wherein
the scheduling server selects the first node from the retrieval device cluster by obtaining a load value of each node in the retrieval device cluster, and
the obtaining comprises:
- establishing a dynamic load table indicating the load value of each node in the retrieval device cluster;
- updating the dynamic load table to reflect current load distribution by repeatedly determining, for each node
  - a load value of each of one or more retrieval servers in the respective node, and
  - the load value of the respective node by averaging the load values of the one or more retrieval servers in the respective node; and
- obtaining the load value of each node in the retrieval device cluster from the dynamic load table.

19. The face retrieval apparatus according to claim 12, wherein the processing circuitry selects the first node from the retrieval device cluster by obtaining a load value of each node in the retrieval device cluster, and
the obtaining comprises:
- establishing a dynamic load table indicating the load value of each node in the retrieval device cluster;
- updating the dynamic load table to reflect current load distribution by repeatedly determining, for each node
  - a load value of each of one or more retrieval servers in the respective node, and
  - the load value of the respective node by averaging the load values of the one or more retrieval servers in the respective node; and
- obtaining the load value of each node in the retrieval device cluster from the dynamic load table.

\* \* \* \* \*